H. SHUPERT.
SEPARATOR SIEVE.
APPLICATION FILED JAN. 22, 1909.
922,732.
Patented May 25, 1909.
2 SHEETS—SHEET 1.
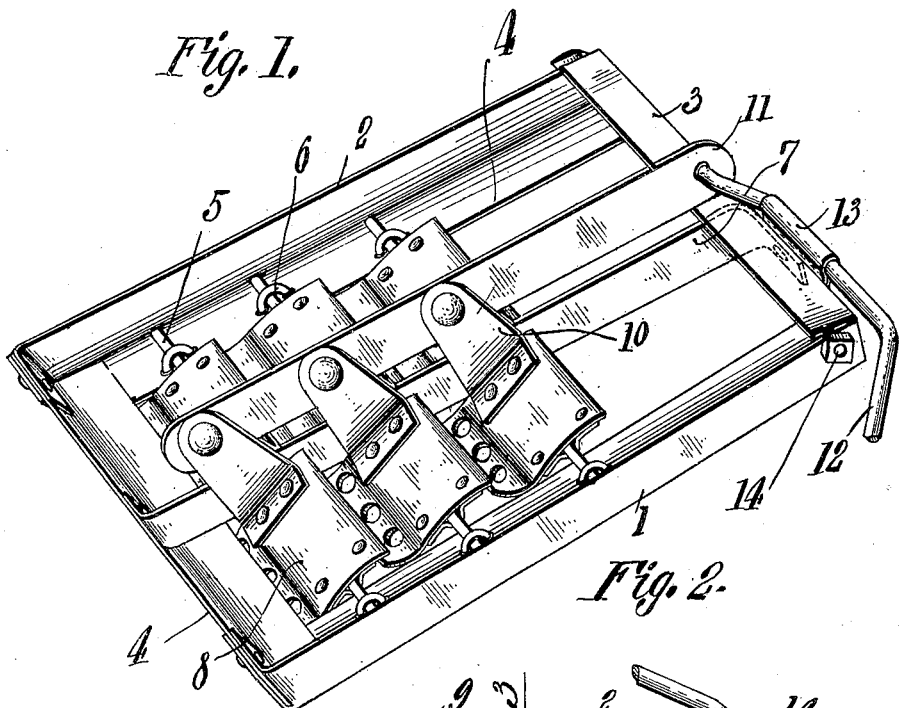
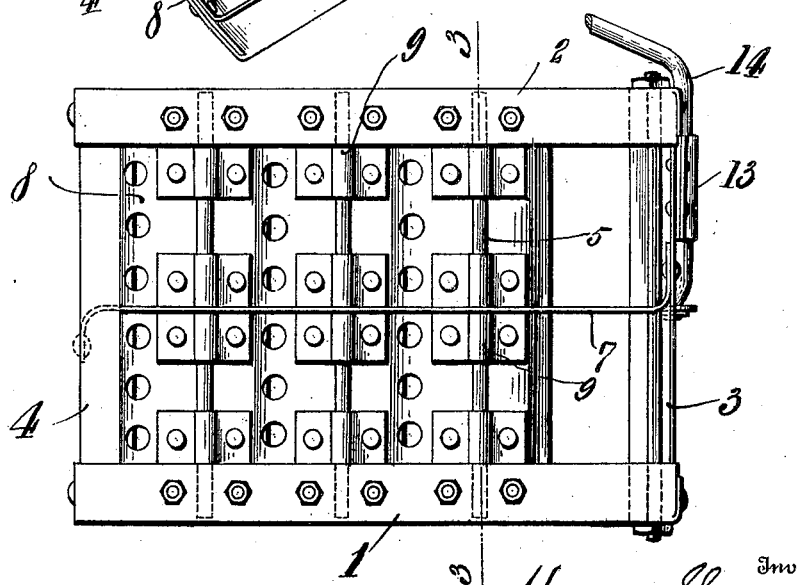
Witnesses
Morris Lessin
Fannie Jacobs
Inventor
Horace Shupert
By Watson E. Coleman
Attorney H. SHUPERT.
SEPARATOR SIEVE.
APPLICATION FILED JAN. 22, 1909.
922,732.
Patented May 25, 1909.
2 SHEETS—SHEET 2.
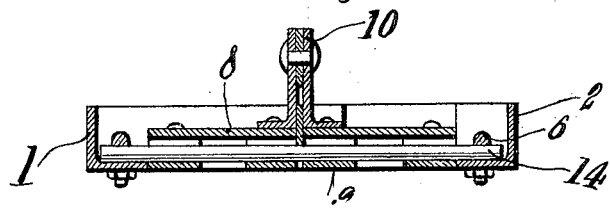
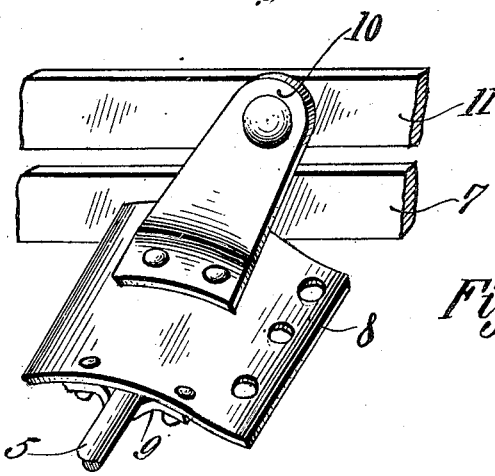
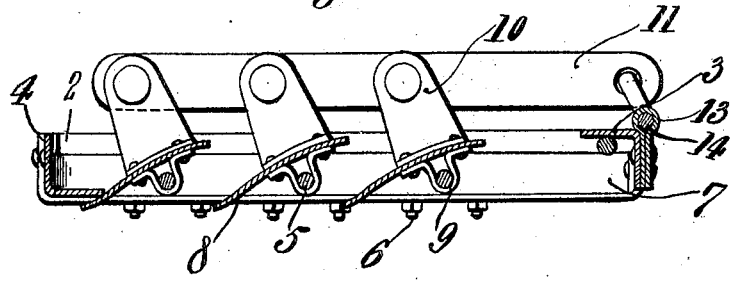

UNITED STATES PATENT OFFICE.

HORACE SHUPERT, OF ELKHART, INDIANA.

SEPARATOR-SIEVE.

No. 922,732.  Specification of Letters Patent.  Patented May 25, 1909.

Application filed January 22, 1909. Serial No. 473,663.

*To all whom it may concern:*

Be it known that I, HORACE SHUPERT, a citizen of the United States, residing at Elkhart, in the county of Elkhart and State of Indiana, have invented certain new and useful Improvements in Separator-Sieves, of which the following is a specification, reference being had to the accompanying drawings.

This invention relates to improvements in separator sieves and has for its object the production of a separator sieve having a frame of angle iron and a plurality of sieve leaves adjustable thereon and detachably connected thereto, so that a broken leaf may be readily removed or replaced by a perfect one.

With the above and other objects in view this invention comprises certain combinations, constructions and arrangement of parts clearly described in the following specification and shown in the accompanying drawings, in which, Figure 1 is a perspective view of the sieve; Fig. 2 is a bottom plan view of the sieve, Fig. 3 is a transverse sectional view taken on line 3—3 of Fig. 2. Fig. 4 is a detail perspective view of one of the leaves, and, Fig. 5 is a central longitudinal section through the sieve.

Referring to the drawings, 1 and 2 denote the side members of the frame and 3 and 4 the end members, each being fomred of angle iron, and all of them being connected together so that the horizontal flanges of members 1, 2 and 4 will extend on a substantially common plane and the horizontal flanges of the side members will form a seat for the ends of the leaf shafts, while the vertical flanges of all the members will form an embracing shield for the sieve leaves. Extending transversely of the frame is a plurality of supporting shafts 5, which have their opposite ends secured to the horizontal flanges of the side members by detachable U-shaped bolts 6 which extend downwardly through said flanges. A central brace bar 7, preferably formed of flat material, extends centrally of the frame and has its opposite ends bent at right angles and, bolted or riveted to the vertical flanges of the end members, and said brace bar 7, is formed with a series of longitudinally spaced apertures through which the shafts 5 extend. Each shaft is provided with a pair of sieve leaves or blades 8 which are of convex shape in cross section which have their forward edges curved outwardly in a direction opposite to that of the convex main portion of the leaves. Said curved or rounded forward ends of the leaves form an incline for the grain and they are provided with transverse rows of perforations. The leaves 8 are mounted in series upon the shafts 5 by means of bearing plates or straps 9 which are bolted to the underside of the blades or leaves. The leaves 8 are so arranged on the frame that the series on one side of the brace bar 7 will be parallel with the series on the opposite side of the brace bar, and the rear edges of the forward leaves will be disposed above the forward edges of the adjacent leaves, whereby the air blasts will be effectively utilized in separating the grain.

Secured to the inner edges of the leaves is a series of upstanding rocker arms which extend vertically against opposite sides of the brace bar and above the same, and at their upper ends are pivotally connected to a longitudinally-extending shaker or shifting bar 11 which projects rearwardly to form pivot connection with a rock shaft 12, which shaft is secured to the vertical flange of the end member 3 by a U-shaped bearing strap 13. The horizontal flange of the end member 3 is preferably disposed above the plane of the remaining horizontal flanges and a securing brace rod 14 extends across the frame directly beneath the horizontal flange of the end member, whereby the sieve may be connected to a separator.

By rocking the shaft 12 the leaves 8 will be tilted on the shafts 5 so that grain accumulated thereon will be forced therefrom. When a leaf or blade becomes broken the same may be quickly removed by disconnecting the screw bolts 6 and sliding the shaft of the broken leaf or blade through the vertical flanges of the side members, the same being suitably apertured for this purpose. Should it be desired the rocker arms 10 of the leaves 8 may be connected to independent shifting bars adapted to be operated by different levers or rocking shafts.

Having thus described my invention, I claim:

A separator sieve comprising a rectangular frame having side and end members, a centrally arranged longitudinally extending brace fixed at its ends to the end members, a series of transverse shafts rotatable in bearings upon the side members and said central brace, sieve leaves of convex shape in cross section secured intermediate their ends on the shafts, one of said leaves being arranged on each side of the central brace, said leaves having their forward ends perforated and curved outwardly in a direction opposite to that of the main portion of the leaves, angular rocker arms fixed to the inner portions of the sieve leaves and extending upwardly on opposite sides of and above the central brace, a longitudinally extending shifting rod arranged between the pairs of opposing rocker arms, transverse pivots passed through said shifting rod and the pairs of rocker arms and a crank shaft mounted at one end of the frame and having a crank portion connected to said shifting rod, whereby the sieve leaves will be simultaneously adjusted.

In testimony whereof I hereunto affix my signature in the presence of two witnesses.

HORACE SHUPERT.

Witnesses:
CHARLEY THORNTON,
BENJAMIN LONG.